(12) United States Patent
Rodriguez et al.

(10) Patent No.: US 9,165,089 B2
(45) Date of Patent: Oct. 20, 2015

(54) PRESENTING UNIQUE SEARCH RESULT CONTEXTS

(71) Applicant: International Business Machines Corporation, Armonk, NY (US)

(72) Inventors: Adrian X. Rodriguez, Durham, NC (US); Eric Woods, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 49 days.

(21) Appl. No.: 14/057,161

(22) Filed: Oct. 18, 2013

(65) Prior Publication Data

US 2014/0046932 A1    Feb. 13, 2014

Related U.S. Application Data

(63) Continuation of application No. 13/447,562, filed on Apr. 16, 2012.

(51) Int. Cl.
*G06F 17/00* (2006.01)
*G06F 17/30* (2006.01)

(52) U.S. Cl.
CPC .... *G06F 17/30991* (2013.01); *G06F 17/30156* (2013.01); *G06F 17/30696* (2013.01)

(58) Field of Classification Search
CPC .......... G06F 17/3071; G06F 17/30864; G06F 17/30787; G06F 17/3084
See application file for complete search history.

(56) References Cited

U.S. PATENT DOCUMENTS

| | | | |
|---|---|---|---|
| 7,031,968 B2 | 4/2006 | Kremer et al. |
| 7,689,647 B2 | 3/2010 | Joy et al. |
| 8,010,524 B2 | 8/2011 | Chen et al. |
| 8,108,371 B2 | 1/2012 | Dharmarajan et al. |
| 2005/0283464 A1 | 12/2005 | Allsup et al. |

(Continued)

OTHER PUBLICATIONS

Kaisser, M., et al. "Improving Search Results Quality by Customizing Summary Lengths", Proceedings of the 46th Annual Meeting of the Association for Computational Linguistics: *Human Language Technologies* (ACL-08), Jun. 2008, pp. 701-709, Association for Computational Linguistics, Columbus, Ohio, USA.

(Continued)

*Primary Examiner* — Apu Mofiz
*Assistant Examiner* — Thu Nga Nguyen
(74) *Attorney, Agent, or Firm* — Edward J. Lenart; James R. Nock; Kennedy Lenart Spraggins LLP

(57) ABSTRACT

Presenting unique search result contexts, including: receiving, by a search result presentation module, a plurality of search results generated in response to a search query, wherein each search result includes context information associated with the search result; identifying, by the search result presentation module for each search result, a displayable portion of the context information associated with the search result; determining, by the search result presentation module for each search result, whether the displayable portion of the context information is a duplicate of the displayable portion of the context information for another search result; and responsive to determining that the displayable portion of the context information is a duplicate of the displayable portion of the context information for another search result, updating, by the search result presentation module, the displayable portion of the context information for the search result.

7 Claims, 4 Drawing Sheets

(56) References Cited

U.S. PATENT DOCUMENTS

2007/0074125 A1    3/2007   Platt et al.
2011/0208744 A1*   8/2011   Chandiramani et al. ...... 707/741
2011/0313992 A1    12/2011  Groeneveld et al.
2012/0078871 A1*   3/2012   Pugh et al. .................... 707/706
2013/0173569 A1    7/2013   Pearcy
2013/0275408 A1    10/2013  Rodriguez et al.

OTHER PUBLICATIONS

Office Action, U.S. Appl. No. 13/447,562, Oct. 31, 2013, pp. 1-16.

* cited by examiner

PRESENTING UNIQUE SEARCH RESULT CONTEXTS

CROSS-REFERENCE TO RELATED APPLICATION

This application is a continuation application of and claims priority from U.S. patent application Ser. No. 13/447,562, filed on Apr. 16, 2012.

BACKGROUND OF THE INVENTION

1. Field of the Invention

The field of the invention is data processing, or, more specifically, methods, apparatus, and products for presenting unique search result contexts.

2. Description Of Related Art

Modern search engines enable users to submit queries to the search engine. In response to such queries, the search engine will provide a list of results to the user. The list of results may include, for example, a link to a web page that the search engine has identified as being relevant based on the terms of the search query. The list of results may include context information for each search result, where the context information is intended to provide some information about the resource pointed to by the search result.

SUMMARY OF THE INVENTION

Methods, apparatus, and products for presenting unique search result contexts, including: receiving, by a search result presentation module, a plurality of search results generated in response to a search query, wherein each search result includes context information associated with the search result; identifying, by the search result presentation module for each search result, a displayable portion of the context information associated with the search result; determining, by the search result presentation module for each search result, whether the displayable portion of the context information is a duplicate of the displayable portion of the context information for another search result; and responsive to determining that the displayable portion of the context information is a duplicate of the displayable portion of the context information for another search result, updating, by the search result presentation module, the displayable portion of the context information for the search result.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
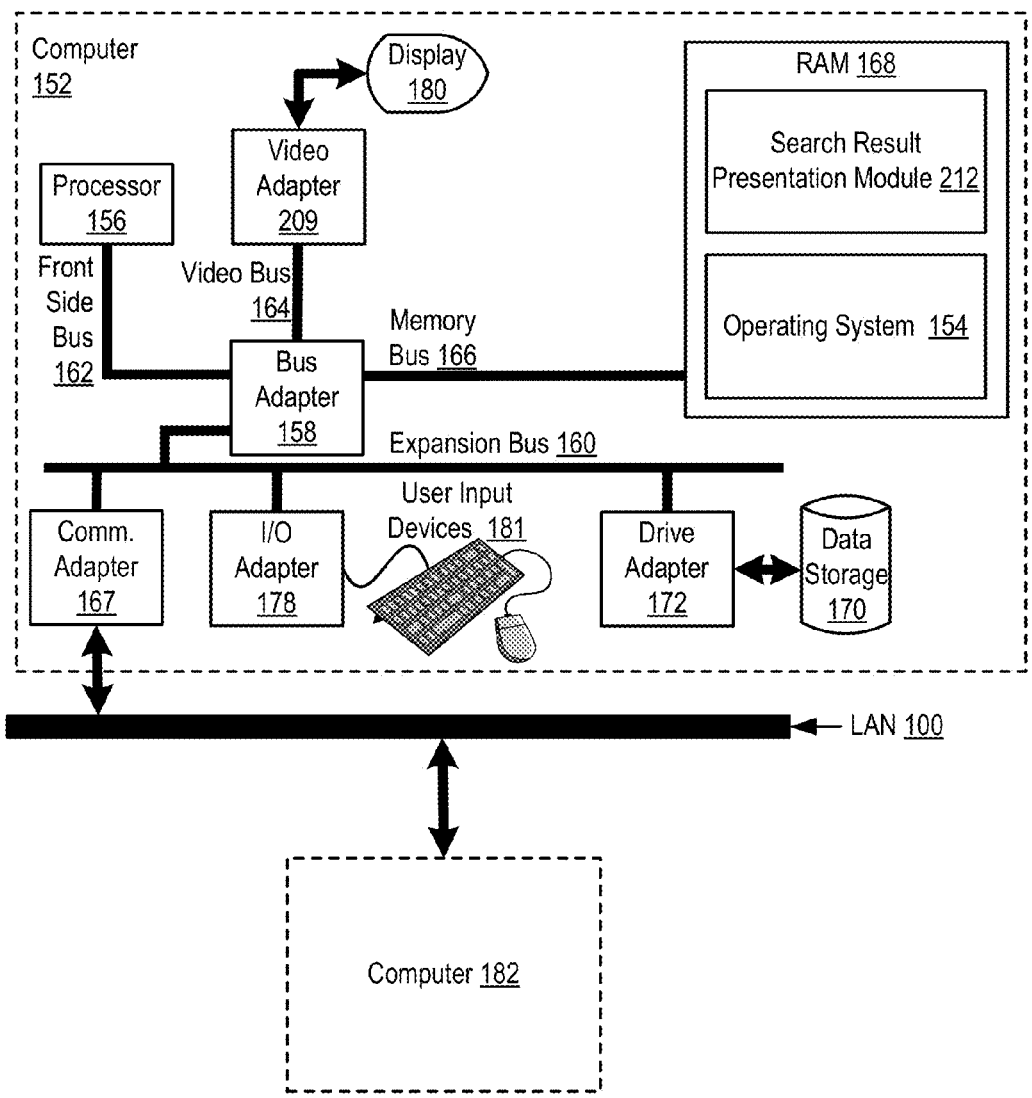
FIG. 1 sets forth a block diagram of automated computing machinery comprising an example computer useful in presenting unique search result contexts according to embodiments of the present invention.

Example methods, apparatus, and products for presenting unique search result contexts in accordance with the present invention are described with reference to the accompanying drawings, beginning with FIG. 1. FIG. 1 sets forth a block diagram of automated computing machinery comprising an example computer (152) useful in presenting unique search result contexts according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a search result presentation module (212), a module of computer program instructions improved for presenting unique search result contexts according to embodiments of the present invention. The search result presentation module (212) of FIG. 1 is configured to receive a plurality of search results generated in response to a search query. In the example of FIG. 1, each search result includes context information associated with the search result. The context information associated with the search result may be embodied, for example, as text that describes the search result, as text taken from a resource pointed to by the search result, and so on. Consider an example in which a particular search result identifies a web page that the search engine determines to be relevant to the search query. In such an example, the context information associated with the particular search result may include, for example, text taken from the header of the web page identified by the search result. Alternatively, the context information associated with the particular search result may include the text in the web page that follows search terms from the search query that were found in the web page. Likewise, the context information associated with the particular search result may include text in the web page that includes search terms from the search query that were found in the web page, and so on.

The search result presentation module (212) of FIG. 1 is further configured to identify, for each search result, a displayable portion of the context information associated with the search result. Identifying a displayable portion of the context information associated with the search result may be carried out, for example, through a rule that specifies a number of words within the context information that are to be displayed with each search result, through a rule that specifies a number of words within the context information that are to be displayed with each search result, through a rule that specifies a number of words that follow a search term within the context information that are to be displayed with each search result, and so on.

The search result presentation module (212) of FIG. 1 is further configured to determine, for each search result, whether the displayable portion of the context information for the search result is a duplicate of the displayable portion of the context information for another search result. Determining whether the displayable portion of the context information for the search result is a duplicate of the displayable portion of the context information for another search result may be carried out, for example, through the use of natural language processing techniques to determine if the displayable portion of the context information for the search result has a similar meaning as the displayable portion of the context information for another search result within a predetermined threshold, by determining whether the displayable portion of the context information for the search result is an identical match of the displayable portion of the context information for another search result, and so on.

The search result presentation module (212) of FIG. 1 is further configured to, responsive to determining that the displayable portion of the context information is a duplicate of the displayable portion of the context information for another search result, updating the displayable portion of the context information for the search result. Updating the displayable portion of the context information for the search result may be carried out, for example, by selecting a different portion of the context information as the displayable portion of the context information, by retrieving additional context information, and so on.

Also stored in RAM (168) is an operating system (154). Operating systems useful presenting unique search result contexts according to embodiments of the present invention include UNIX™, Linux™, Microsoft XP™, AIX™, IBM's i5/OS™, and others as will occur to those of skill in the art. The operating system (154) and search result presentation module (212) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for presenting unique search result contexts according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for presenting unique search result contexts according to embodiments of the present invention include modems for wired dial-up communications, Ethernet (IEEE 802.3) adapters for wired data communications network communications, and 802.11 adapters for wireless data communications network communications.

Figure 2:
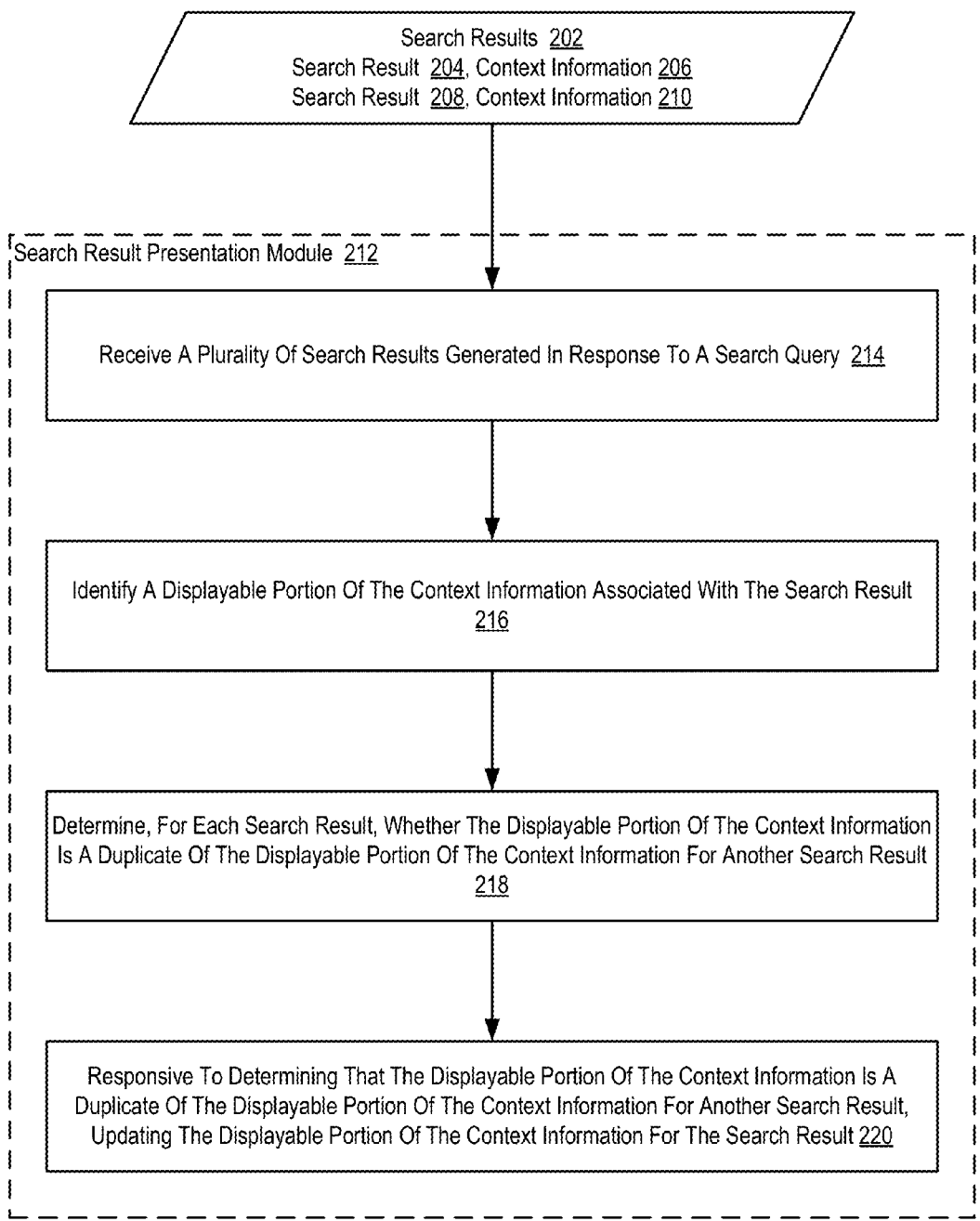
FIG. 2 sets forth a flow chart illustrating an example method for presenting unique search result contexts according to embodiments of the present invention.

For further explanation, FIG. 2 sets forth a flow chart illustrating an example method for presenting unique search result contexts according to embodiments of the present invention. The example method of FIG. 2 includes receiving (214), by a search result presentation module (212), a plurality of search results (202) generated in response to a search query. The search result presentation module (212) of FIG. 2 may be embodied as a module of computer program instructions useful in presenting search results generated by a search engine in response to a search query. The search result presentation module (212) of FIG. 2 may be embodied as a module of the search engine. Alternatively, the search result presentation module (212) of FIG. 2 may be embodied a module of a search result rendering application such as, for example, a web browser.

In the example method of FIG. 2, each search result (204, 208) includes context information (206, 210) associated with the search result (204, 208). In the example method of FIG. 2, the context information (206, 210) associated with the search result (204, 208) may be embodied, for example, as text that describes the search result, as text taken from a resource pointed to by the search result, and so on. Consider an example in which a particular search result (204) identifies a web page that the search engine determines to be relevant to the search query. In such an example, the context information (206) associated with the particular search result (204) may include, for example, text taken from the header of the web page identified by the search result (204). Alternatively, the context information (206) associated with the particular search result (204) may include the text in the web page that follows search terms from the search query that were found in the web page. Likewise, the context information (206) associated with the particular search result (204) may include text in the web page that includes search terms from the search query that were found in the web page, and so on.

Consider an example in which the search term "computing gaming" was entered into a search engine. In such an example, assume that a first search result pointed to a first web page and included the following context information, taken from the text displayed on the first web page: "Shop PC games and new releases, including hardware and accessories. Find everything you need to dominate the competition." Further assume that a second search result pointed to a second web page and included the following context information, taken from the text displayed on the second web page: "A PC game, also known as a computer game, is a video game played on a personal computer. PC games are distinguished from traditional video games that are played on a video game console or arcade machine." Lastly assume that a third search result pointed to a third web page and included the following context information, taken from the text displayed on the third web page: "Shop for PC games and hardware accessories for your gaming system. Games are available via instant download."

The example method of FIG. 2 also includes identifying (216), by the search result presentation module (212) for each search result (204, 208), a displayable portion of the context information (206, 210) associated with the search result (204, 208). In the example method of FIG. 2, identifying (216) a displayable portion of the context information (206, 210)

associated with the search result (204, 208) may be carried out, for example, through a rule that specifies a number of words within the context information (206, 210) that are to be displayed with each search result (204, 208), through a rule that specifies a number of words within the context information (206, 210) that are to be displayed with each search result (204, 208), through a rule that specifies a number of words that follow a search term within the context information (206, 210) that are to be displayed with each search result (204, 208), and so on.

Consider the example described above in which the search term "computing gaming" was entered into a search engine and three results were returned from the search. In such an example, the search result presentation module (212) may specify that the first sentence of the context information of each search result will be designated as the displayable portion of the context information associated with the search result. As such, the displayable portion of the context information associated with the first search result would be "Shop PC games and new releases, including hardware and accessories," the displayable portion of the context information associated with the second search result would be "A PC game, also known as a computer game, is a video game played on a personal computer," and the displayable portion of the context information associated with the third search result would be "Shop for PC games and hardware and accessories for your gaming system."

The example method of FIG. 2 also includes determining (218), by the search result presentation module (212) for each search result (204, 208), whether the displayable portion of the context information for the search result is a duplicate of the displayable portion of the context information for another search result. In the example method of FIG. 2, determining (218) whether the displayable portion of the context information (210) for the search result (208) is a duplicate of the displayable portion of the context information (206) for another search result (204) may be carried out, for example, through the use of natural language processing techniques to determine if the displayable portion of the context information (210) for the search result (208) has a similar meaning as the displayable portion of the context information (206) for another search result (204) within a predetermined threshold, by determining whether the displayable portion of the context information (210) for the search result (208) is an identical match of the displayable portion of the context information (206) for another search result (204), and so on.

Consider the example described above in which the search term "computing gaming" was entered into a search engine and three results were returned from the search. In such an example, the search result presentation module (212) may specify that the displayable portion of the context information for a particular search result is a duplicate of the displayable portion of the context information for another search result if fifty percent of the terms contained in the context information associated with a search result are also found in the context information associated with another search result. When comparing the context information associated with the second search result to the context information associated with the first search result, the only terms contained in the context information associated with the second search result that are also found in the context information associated with the first search result are the terms "PC" and "game." As such, the percentage of terms contained in the context information associated with the second search result that also appear in the context information associated with the first search result is not sufficient to qualify the context information associated with the second search as a duplicate of the context information associated with the first search. In this example, however, the context information associated with the third search result includes the following terms that are also found in the context information associated with the first search result: "shop," "PC," "games," "and," "hardware," and "accessories." As such, six of the eleven terms contained in the context information associated with the third search result are also found in the context information associated with the first search result, such that the context information associated with the third search result qualifies as a duplicate of the context information associated with the first search result.

The example method of FIG. 2 also includes, responsive to determining that the displayable portion of the context information is a duplicate of the displayable portion of the context information for another search result, updating (220), by the search result presentation module (212), the displayable portion of the context information for the search result. In the example method of FIG. 2, updating (220) the displayable portion of the context information for the search result may be carried out, for example, by selecting a different portion of the context information as the displayable portion of the context information.

Consider the example described above in which the search term "computing gaming" was entered into a search engine and three results were returned from the search. In such an example, the search result presentation module (212) may specify that, upon determining that the displayable portion of the context information associated with a particular search result is a duplicate of the displayable portion of the context information for another search result, the displayable portion of the context information for the particular search result is updated to be the next sentence in the context information associated with the particular search result. Because the displayable context information associated with the third search result qualified as a duplicate of the displayable context information associated with the first search result, the displayable context information associated with the third search result can be updated to be the next sentence in the context information associated with the third search result, which reads "Games are available via instant download." As such, the context information that is presented to the user for each search result will be distinct, such that the user is not presented with search results that appear to be indistinguishable and duplicates of other search results.

Figure 3:
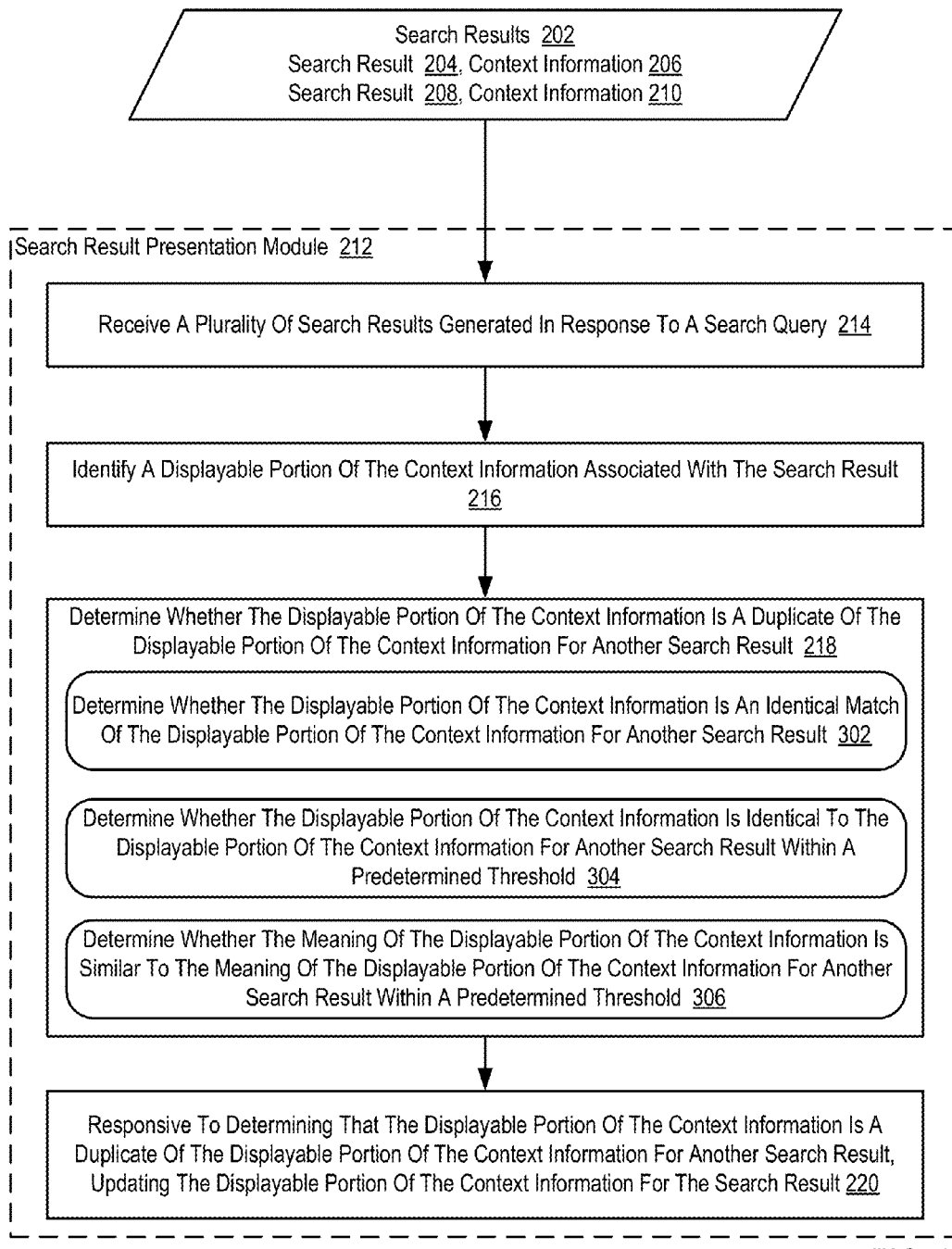
FIG. 3 sets forth a flow chart illustrating a further example method for presenting unique search result contexts according to embodiments of the present invention.

For further explanation, FIG. 3 sets forth a flow chart illustrating a further example method for presenting unique search result contexts according to embodiments of the present invention. The example method of FIG. 3 is similar to the example method of FIG. 2 as it also includes receiving (214) a plurality of search results (202) generated in response to a search query, identifying (216) a displayable portion of the context information (206, 210) associated with the search result (204, 208), determining (218) whether the displayable portion of the context information for the search result is a duplicate of the displayable portion of the context information for another search result, and responsive to determining that the displayable portion of the context information is a duplicate of the displayable portion of the context information for another search result, updating (220) the displayable portion of the context information for the search result.

In the example method of FIG. 3, determining (218) whether the displayable portion of the context information for the search result is a duplicate of the displayable portion of the context information for another search result can include determining (302) whether the displayable portion of the context information for the search result is an identical match of the displayable portion of the context information for another search result. In the example method of FIG. 3, determining (302) whether the displayable portion of the context information for the search result is an identical match of the displayable portion of the context information for another search result may be carried out, for example, through the use of a string comparison algorithm that compares two strings. In such an example, the displayable portion of the context information for each search result may be used as input to such a string comparison algorithm to determine whether context information for each search result is duplicated.

In the example method of FIG. 3, determining (218) whether the displayable portion of the context information for the search result is a duplicate of the displayable portion of the context information for another search result can alternatively include determining (304) whether the displayable portion of the context information is identical to the displayable portion of the context information for another search result within a predetermined threshold. In the example method of FIG. 3, the predetermined threshold may specify, for example, the percentage of terms in the displayable portion of the context information for a search result that must also be contained in the displayable portion of the context information for another search result in order for the context information associated with each search result to be characterized as being duplicates. For example, the predetermined threshold may specify that the context information associated with a first search result is a duplicate of the context information associated with a second search result if fifty percent of the terms contained in the context information associated with the first search result are also found in the context information associated with the second search result. In such an example, the predetermined threshold may be a set to a default value, set by a user, set by a system administrator, and so on.

In the example method of FIG. 3, determining (218) whether the displayable portion of the context information for the search result is a duplicate of the displayable portion of the context information for another search result can alternatively include determining (306) whether the meaning of the displayable portion of the context information associated with the search result is similar to the meaning of the displayable portion of the context information associated with another search result within a predetermined threshold. In the example method of FIG. 3, the meaning of the displayable portion of the context information associated with a particular search result can be determined, for example, through the use of natural language processing techniques. Natural language processing is a field of computer science, artificial intelligence, and linguistics concerned with the interactions between computers and natural languages utilized by humans. Natural language processing techniques can be composed of computer program instructions configured to extract meaningful information from natural language input. In such an example, the displayable portion of the context information for each search result may be used as input to such a natural language processing algorithm to identify the extent to which the meaning of the displayable portion of the context information for each search result are similar. If the extent to which the meaning of the displayable portion of the context information for each search result are similar exceeds the predetermined threshold, the displayable portion of the context information for each search result are characterized as being duplicates.

Figure 4:
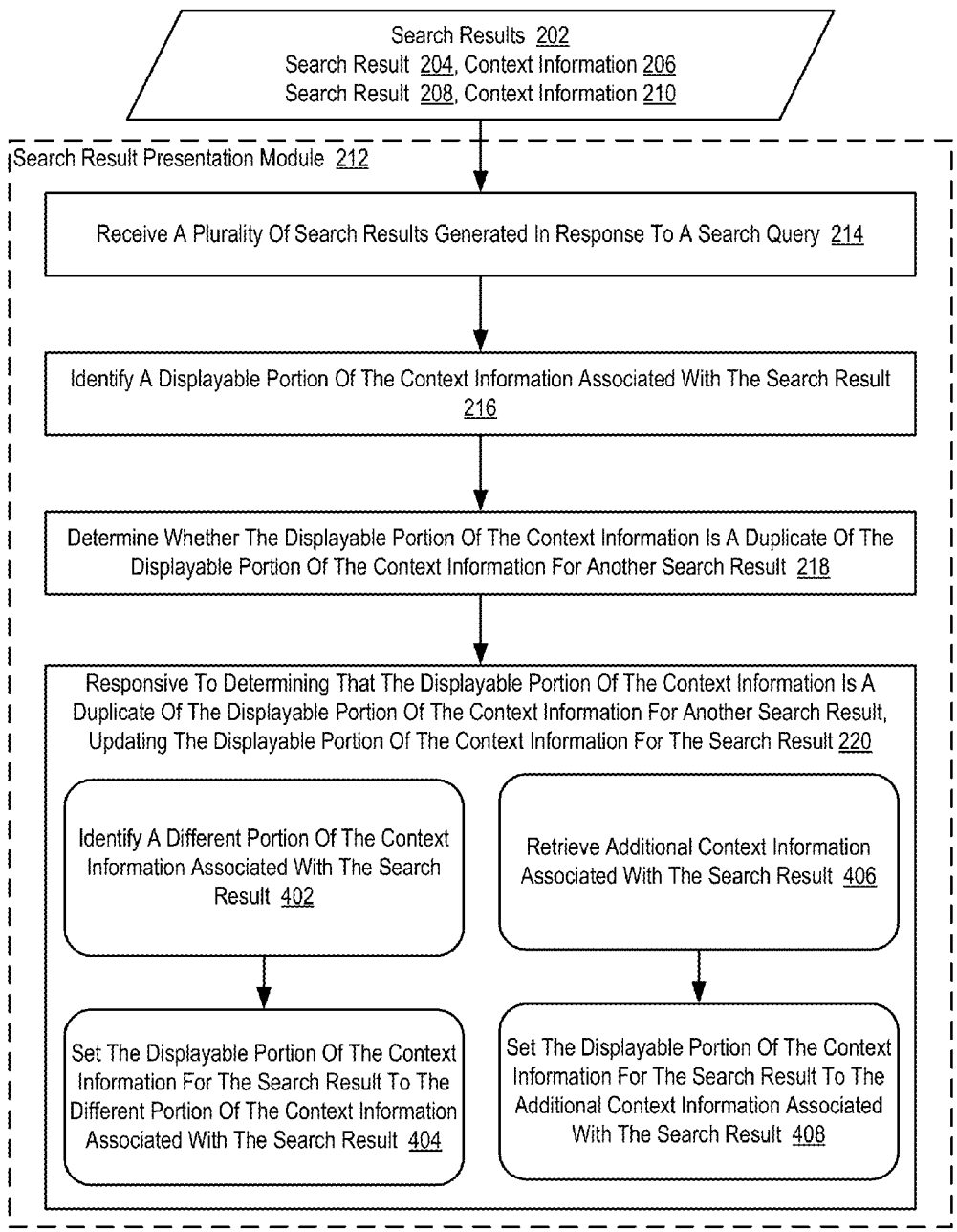
FIG. 4 sets forth a flow chart illustrating a further example method for presenting unique search result contexts according to embodiments of the present invention.

For further explanation, FIG. 4 sets forth a flow chart illustrating a further example method for presenting unique search result contexts according to embodiments of the present invention. The example method of FIG. 4 is similar to the example method of FIG. 2 as it also includes receiving (214) a plurality of search results (202) generated in response to a search query, identifying (216) a displayable portion of the context information (206, 210) associated with the search result (204, 208), determining (218) whether the displayable portion of the context information for the search result is a duplicate of the displayable portion of the context information for another search result, and responsive to determining that the displayable portion of the context information is a duplicate of the displayable portion of the context information for another search result, updating (220) the displayable portion of the context information for the search result.

In the example method of FIG. 4, updating (220) the displayable portion of the context information for the search result can include identifying (402), by the search result presentation module (212), a different portion of the context information associated with the search result. In the example method of FIG. 4, identifying (402) a different portion of the context information associated with the search result may be carried out by selecting a portion of the context information associated with the search result that does not include the portion of the context information associated with the search that was determined to be a duplicate of the displayable portion of the context information associated with another search result.

In the example method of FIG. 4, updating (220) the displayable portion of the context information for the search result can include setting (404), by the search result presentation module (212), the displayable portion of the context information for the search result to the different portion of the context information associated with the search result. Consider the example described above in which the context information associated with a particular search result included the following text: "Shop for PC games and hardware accessories for your gaming system. Games are available via instant download." In the example described above, the phrase "Shop for PC games and hardware accessories for your gaming system" was identified as being a duplicate of the displayable portion of another search result. In such an example, setting (404) the displayable portion of the context information for the search result to the different portion of the context information associated with the search result could be carried out by designating the second sentence of the context information as the displayable portion of the context information, such that the displayable portion of the context information would be set (404) to "Games are available via instant download."

In the example method of FIG. 4, updating (220) the displayable portion of the context information for the search result can alternatively include retrieving (406), by the search result presentation module (212), additional context information associated with the search result. In the example method of FIG. 4, retrieving (406) additional context information associated with the search result may be carried out, for example, by extracting additional text from a web page pointed to in a search result. Consider the example described above in which the context information associated with a particular search result included the following text: "Shop for PC games and hardware accessories for your gaming system. Games are available via instant download." In this example, assume that the entire phrase was identified as being a duplicate of the displayable portion of another search result. In such an example, the sentence that follows "Games are available via instant download" may be retrieved from the web page pointed to by the search result.

In the example method of FIG. 4, updating (220) the displayable portion of the context information for the search result can also include setting (408), by the search result presentation module (212), the displayable portion of the context information for the search result to the additional context information associated with the search result. Consider the example described above in which the context information associated with a particular search result included the following text: "Shop for PC games and hardware accessories for your gaming system. Games are available via instant download." In this example, assume that the entire phrase was identified as being a duplicate of the displayable portion of another search result. In such an example, setting (408) the displayable portion of the context information for the search result to the additional context information associated with the search result could be carried out by setting (408) the displayable portion of the context information for the search result to the sentence that follows "Games are available via instant download," which was previously retrieved (406).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of presenting unique search result contexts, the method comprising:
   receiving, by a search result presentation module, a plurality of search results generated in response to a search query, wherein each search result includes context information associated with the search result;
   identifying, by the search result presentation module for each search result, a displayable portion of the context information associated with the search result;
   determining, by the search result presentation module for each search result, whether the displayable portion of the context information for the search result is a duplicate of the displayable portion of the context information for another search result; and
   responsive to determining that the displayable portion of the context information for the search result is a duplicate of the displayable portion of the context information for another search result, updating, by the search result presentation module, the displayable portion of the context information for the search result, including:
      identifying, by the search result presentation module, a different portion of the context information associated with the search result; and
      changing part of the displayable portion of the content by setting the displayable portion of the context information for the search result to the different portion of the context information associated with the search result.

2. The method of claim 1 wherein determining whether the displayable portion of the context information for the search result is a duplicate of the displayable portion of the context information for another search result further comprises determining whether the displayable portion of the context information associated with the search result is an identical match of the displayable portion of the context information associated with another search result.

3. The method of claim 1 wherein determining whether the displayable portion of the context information for the search result is a duplicate of the displayable portion of the context information for another search result further comprises determining whether the displayable portion of the context information associated with the search result is identical to the displayable portion of the context information associated with another search result within a predetermined threshold.

4. The method of claim 1 wherein determining whether the displayable portion of the context information for the search result is a duplicate of the displayable portion of the context information for another search result further comprises determining whether the meaning of the displayable portion of the context information associated with the search result is similar to the meaning of the displayable portion of the context information associated with another search result within a predetermined threshold.

5. The method of claim 1 wherein updating the displayable portion of the context information for the search result further comprises:
   retrieving, by the search result presentation module, additional context information associated with the search result; and
   setting, by the search result presentation module, the displayable portion of the context information for the search result to the additional context information associated with the search result.

6. The method of claim 1 wherein the search result presentation comprises a module of a search engine.

7. The method of claim 1 wherein the search result presentation module comprises a module of a search result rendering application.

* * * * *